Nov. 14, 1961 G. McGUIRE Re. 25,078

SAFETY SWIMMING POOL COVER

Original Filed May 7, 1958 2 Sheets-Sheet 1

George McGuire
INVENTOR.

BY Clarence A. O'Brien and Harvey B. Jacobson
Attorneys

Nov. 14, 1961 G. McGUIRE Re. 25,078
SAFETY SWIMMING POOL COVER
Original Filed May 7, 1958 2 Sheets-Sheet 2
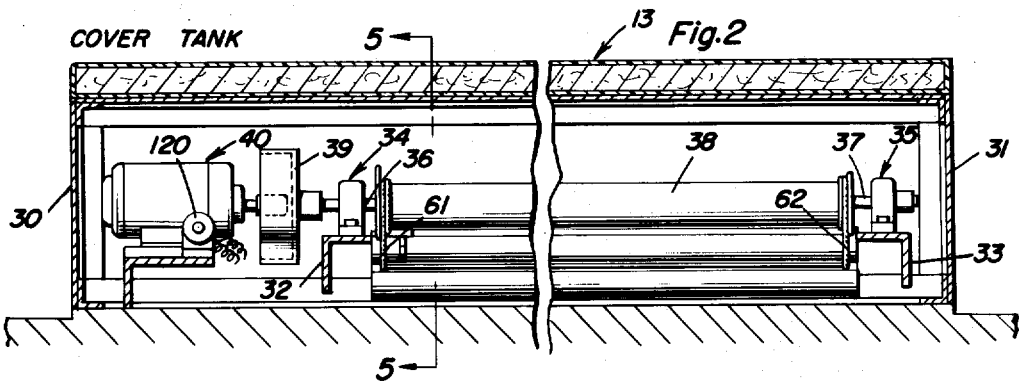
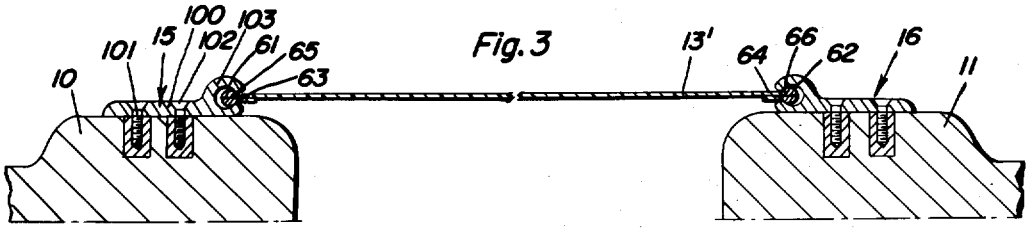
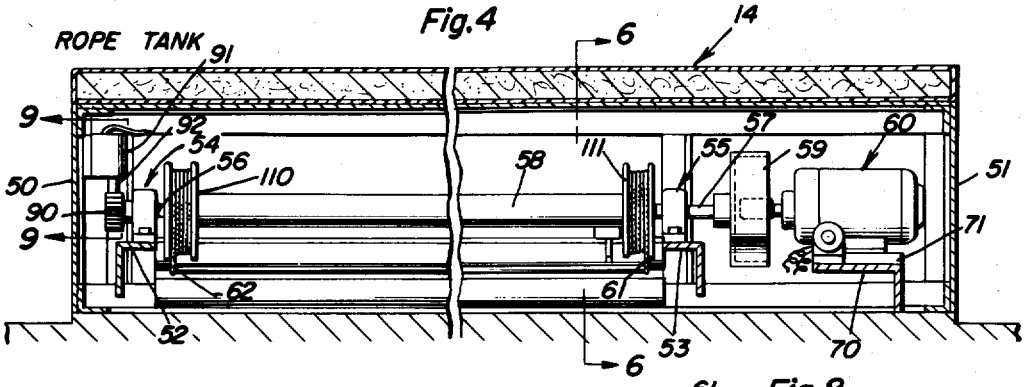
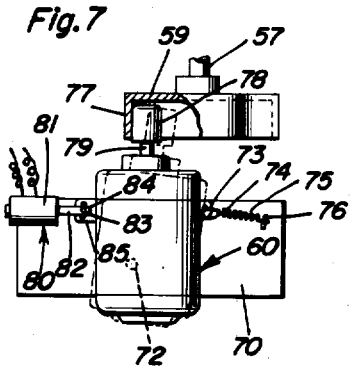
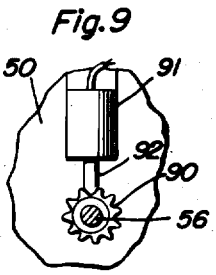
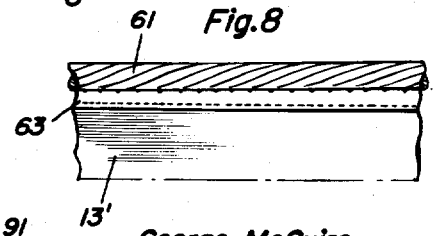
George McGuire
INVENTOR.
BY Clarence A. O'Brien and Harvey B. Jacobson
Attorneys United States Patent Office Re. 25,078
Reissued Nov. 14, 1961

25,078

SAFETY SWIMMING POOL COVER

George McGuire, Lynwood, Calif.

Original No. 2,898,607, dated Aug. 11, 1959, Ser. No. 733,662, May 7, 1958. Application for reissue Aug. 12, 1959, Ser. No. 833,363
5 Claims. (Cl. 4—172)

Matter enclosed in heavy brackets [ ] appears in the original patent but forms no part of this reissue specification; matter printed in italics indicates the additions made by reissue.

This invention relates in general to accessory items for swimming pools and the like and pertains more particularly to a cover assembly therefor.

In addition to the fact that an open swimming pool tends to collect a great deal of trash and foreign material, particularly during certain seasons of the year, an open pool presents a substantial hazard particularly at night or when unattended and it is not unusual for persons, particularly children, to accidentally fall into a pool and drown. It is therefore of primary concern in connection with this invention to provide an assemblage for use in conjunction with a swimming pool which will provide a cover therefor at any time so desired, particularly when the pool is unattended.

Another object of this invention is to provide an assemblage of the character defined which will be neat and pleasing in appearance both when in use and when stored.

A further object of this invention is to provide a cover assemblage for a swimming pool wherein the cooperation between the various component parts is such as to provide a very efficient and effective cover for a swimming pool and which will remain in substantially taut condition and which will be firmly engaged substantially completely around the peripheral portion thereof so as to positively prevent accidental entry into a pool so covered.

Another object of this invention is to provide an improved cover for swimming pools incorporating a pair of housing assemblies, located at opposite ends of a pool and each containing roller mechanisms for reeling therebetween a pair of parallel rope elements *or cables*, the rope elements themselves carrying therebetween at intermediate portions of their lengths a flexible cover element constructed of canvas or the like, the roller mechanisms incorporating positive drive elements for reeling or winding a rope between one roller mechanism and the other.

Still another object of this invention resides in the provision of improvements in swimming pool covers wherein the cover assemblage is neat and pleasing in appearance and wherein it includes mechanism of simple yet efficient construction.

A further object of this invention is to provide a cover assembly for swimming pools including a pair of housings or chambers containing roller mechanisms therein for winding thereon a pair of spaced, parallel rope elements which extend therebetween and to feed the same back and forth between the roller mechanisms, the rope elements carrying therebetween, *at* an intermediate portion of their lengths, a flexible cover assembly of an area to completely cover an associated swimming pool, and there being located, on opposite sides of the swimming pool between the roller mechanisms, guide elements for receiving and containing therewithin portions of the ropes as they are payed between the roller mechanisms and so as to hold the flexible cover, when in operative position in taut relationship over an associated swimming pool.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged vertical section taken substantially along the plane of section line 2—2 of FIGURE 1 and illustrating details of the cover tank assembly and showing the operative association of parts disposed therewithin;

FIGURE 3 is an enlarged transverse sectional view taken substantially along the plane of section line 3—3 of FIGURE 1 illustrating the details of the guide mechanisms and the association of the rope elements therewith and illustrating the manner in which the cover assembly is carried between the flights of the ropes;

FIGURE 4 is an enlarged vertical section taken substantially along the plane of section line 4—4 in FIGURE 1 and illustrating the details of the internal construction of the rope tank assembly;

FIGURE 7 is a plan view of the drive mechanism associated with the cover and rope tanks and illustrating, in dotted lines, the de-clutched position of the driving motor;

FIGURE 8 is an enlarged view of an edge portion of the cover assembly and illustrating the manner in which the rope and the cover are interconnected; and FIGURE 9 is an enlarged section taken substantially along the plane of section line 9—9 in FIGURE 4 and showing details of the brake-pawl mechanism.

Figure 1:
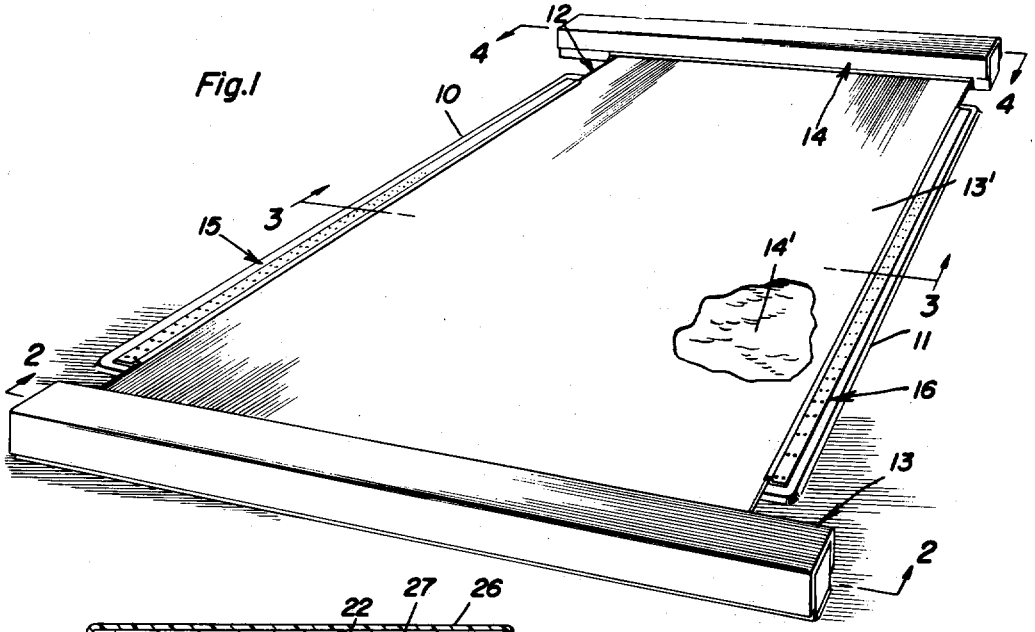
FIGURE 1 is a perspective view of a swimming pool showing the improved cover assembly operatively associated therewith and disposed in covering relation thereto.

Referring now more particularly to FIGURE 1, reference numerals 10 and 11 indicate the side walls portions of a swimming pool or, more accurately the apron portions along the opposite sides of a pool. In FIGURE 1, the invention is shown in operative association with the pool and in covering relationship thereto. The cover assembly is indicated generally by the reference character 12 and consists essentially of a flexible sheet of canvas 13' or other similar material mounted in a manner hereinafter described to be disposed in taut covering relationship to the pool lying therebeneath, the cover in FIGURE 1 being partly broken away to indicate the body of water 14' beneath the cover assembly.

Essentially, the cover assemblage includes a pair of tank *elements* or chamber assemblies indicated generally by the reference characters 13 and 14 and being respectively for the purpose of housing the cover when not in use and for housing the rope mechanism for operating the cover when the device is in use. For the purpose of holding the cover taut from side to side of the swimming pool, guide assemblies indicated generally by the reference characters 15 and 16 are rigidly affixed to the apron portions 10 and 11 previously described, the operation and use of the guide assemblies being hereinafter described. With reference now more particularly to FIGURE 2 wherein the cover tank or chamber assembly is more clearly shown and, in conjunction therewith, FIGURE 5, it will be seen that the cover assembly 13 includes a pair of opposite side walls 20 and 21 interconnected at their upper ends by a top wall member 22 and having mounting bracket elements 23 and 24 along the bottom edges of the walls 20 and 21 respectively for securing the cover assembly to the structure adjacent the pool.

To lend a pleasing appearance to the cover assembly and to prevent injury by contact therewith, the same is provided with a cushion 25 consisting of an outer envelope 26 containing a filler of soft resilient material 27, such as sponge rubber or the like, the material of the cover 26 being so chosen as to lend an attractive appearance to the cover assembly. It will be readily appreciated that the tanks, when so covered with the assemblages 25, will provide convenient bench portions.

The opposite ends of the tank assembly 13 are closed by the end wall members 30 and 31 so as to provide a confined space therewith. Within the tank 13 are a pair of pedestals 32 and 33 mounting the pillow block assemblies indicated generally by the reference characters 34 and 35 which, in turn rotatably journal the shaft portions 36 and 37 integral with the roller element 38 disposed between the pillow block assemblies. The shaft portion 36 carries, outboard of the pillow block assembly 34, a flanged pulley or wheel 39 having operative association with a driving motor 40, hereinafter more fully described.

Figure 6:
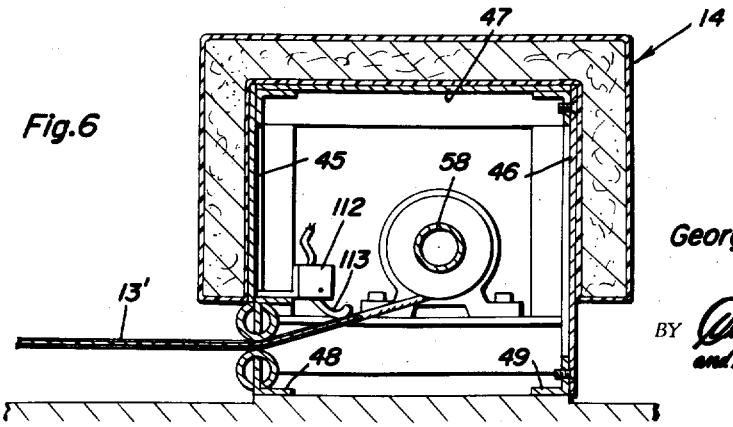
FIGURE 6 is a transverse sectional view taken substantially along the plane of section line 6—6 in FIGURE 4 and showing further details of the internal construction of the rope tank assemblage illustrating the disposition of the limit switch therewithin.

As can be seen most clearly from FIGURES 4 and 6, the rope tank 14 is constructed similarly to the cover tank 13. That is to say, the rope tank includes the side wall portions 45 and 46, the top wall 47 and the mounting bracket portions 48 and 49 as well as the end walls 50 and 51, forming a chamber or enclosure therewithin. Likewise, the rope tank is provided with pedestals 52 and 53 mounting the pillow blocks 54 and 55 therewithin which journal the shaft portions 56 and 57 carrying therebetween the roller element 58. The shaft portion 57 has rigidly affixed thereto a flanged wheel 59 having operative association with the driving motor 60, hereinafter more fully described.

To carry the cover element 13', there is provided a pair of ropes 61 and 62 which extend between the tanks 13 and 14 and are affixed, at their opposite ends, respectively, to the rollers 38 and 58. Intermediate portions of the rope, as is seen most clearly in FIGURES 3 and 8, have rigidly affixed thereto the doubled over edge portions 63 and 64 at the opposite sides of the cover member 13, there being suitable stitching, fasteners or the like 65 and 66 serving this purpose.

The mounting for the drive motors 40 and 60 and the cooperation therewith with the respective wheels 39 and 59 is identical and for this reason a description with reference to FIGURE 4 only will be provided. In FIGURE 4, it will be noted that the rope tank shown therein includes a further pedestal 70 mounting the driving motor 60 thereon. The driving motor includes a base 71 which is pivoted by means of an element 72, see particularly FIGURE 7, to the pedestal 70, so as to permit swinging of the driving motor 60 between the full and dotted line positions illustrated in FIGURE 7.

The base of the motor is provided with an ear 73 having an aperture 74 therein to which one end of a tension spring 75 is attached, the opposite end of the spring being fixed to an ear 76 rigid with the pedestal 70 and the spring is so connected to the motor as to normally pull the same out of engagement with the flange portion 77 of the associated wheel 59. That is to say, the normal position of the motor is in the dotted line position illustrated in FIGURE 7, wherein the drive element 78 on the shaft 79 of the motor will be out of engagement with the inner surface of the flange 77 and the wheel 59. In order to establish contact between the drive element 78 and the inner surface of the flange 77, a solenoid indicated generally by the reference character 80 is provided. The solenoid case 81 is mounted directly to the pedestal 70 with the armature 82 extending therefrom and being connected as by pin 83 working in an elongate slot 84 in ear 85 which is connected to the motor. When the solenoid 80 is excited, the armature 82 is urged into the casing 81 so as to swing the motor against the action of the tension spring 75 so as to engage the drive element 78 with the inner surface of the flange 77 of the wheel 59. Simultaneously with the actuation of the solenoid 80, the field of the motor 60 is excited and drive is imparted to the wheel 59 to rotate the shaft 57 and consequently the roller 58 is a corresponding direction. It will be appreciated that a suitable control button is provided for initially actuating the solenoid 80 and the associated drive motor 60. The operation of the drive motors 40 and 60 is such as to cause actuation of the associated rollers for moving the assemblage in opposite directions, as is necessary and desired.

The rope tank contains elements not provided in the cover tank assembly and included in the drive mechanism therefor. These additional elements are the ratchet wheel 90 fixed to the outboard end of the shaft portion 56 and the solenoid 91 mounted above such ratchet wheel and including an armature portion 92 engageable with the ratchet wheel 90. The pawl and ratchet mechanism affords a brake for the roller 58 as will be more fully described hereinafter.

Figure 5:
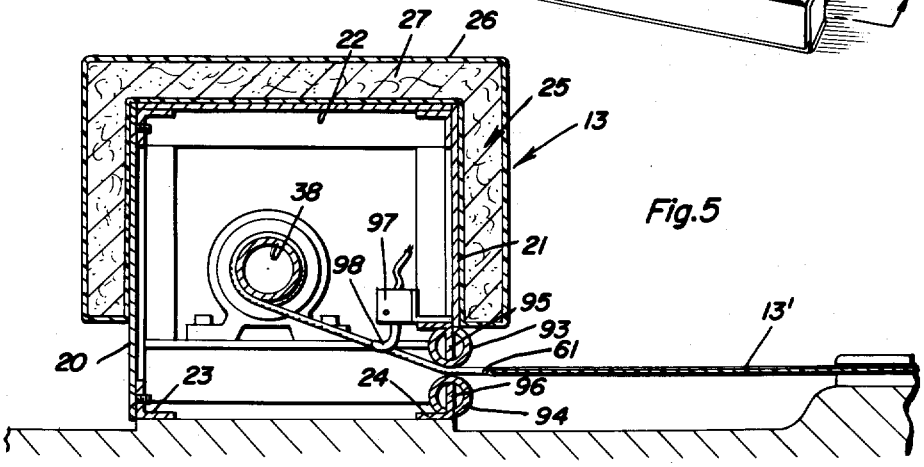
FIGURE 5 is a transverse sectional view taken substantially along the plane of section line 5—5 in FIGURE 2 illustrating further details of the internal construction of the cover tank assemblage and illustrating the disposition of the limit switch disposed therewithin.

Further, each tank assembly 13 and 14 includes the tubular guide elements 93 and 94 as is most specifically shown in FIGURE 5, the construction of each tank being identical in this respect. These tubular elements 93 and 94 are split longitudinally and are engaged over the opposed wall portions 95 and 96 as illustrated in FIGURE 5 and are disposed in slightly spaced relationship to each other to provide curved and smooth edges for engagement with the ropes *or cables* 61 and 62 and with the cover assembly 13'. Additionally, each tank assembly has a limit switch 97 mounted therewithin including an actuating finger 98 disposed in the path of movement of the cover element 13' and between the ropes 61 and 62 such that when the cover engages therewith, the finger 98 will be actuated.

The previously mentioned guide strips 10 and 11 are shown most clearly in FIGURE 3 and each includes a base portion 100 which is affixed as by fasteners 101 and 102 to the aprons or sides 10 and 11 of the pool. On the inner side of each guide 15 and 16 are the substantially C-shaped guide elements 103 defining recesses receiving the ropes 61 and having slots opening inwardly which are of a dimension less than the diameter of the ropes 61 and 62 to prevent the ropes from pulling therethrough. From this construction, it will be readily appreciated that the cover 13' is thereby held in taut relationship from side to side of the tool whereas the roller assemblies 38 and 58 maintain the longitudinal tautness of the cover assembly when it is in use.

In the operation of the device, assuming that the cover is rolled up within the cover tank 13, the controls are manipulated so as to operate the driving motor 60 for the rope tank which will rotate the roller 58 in such direction as to wind the rope thereon and upon the spools 110 and 111 fixed to such roller as illustrated most clearly in FIGURES 4 and 6. Once having been actuated, the motor 60, when the solenoid 80 swings into engaged position with the wheel 59, will continue to actuate the roller and the spools 110 and 111 until such time as the limit switch 112 has its actuating finger 113 engaged by the cover 13' as is illustrated in FIGURE 6. This will break the circuit to the drive motor 60 and to the solenoid 80 to interrupt operation of the drive. The solenoid 91 is also in circuit with the motor 60 so as to withdraw the pawl 92 during the actuation of the motor and operation of the roller 58. When it is desired to return the cover to its inoperative or stored position, the controls are actuated to operate the drive motor 40 and its corresponding solenoid 120. In this case, the drive motor 40 will continue to operate until such time as the limit switch 97 is actuated by the cover 13' by release of the finger 98 from engagement with the cover after the same has been completely rolled upon the roller 38, which action breaks the circuit to the driving motor 40 and ceases operation thereof. The solenoid 91 is also in circuit with the motor 40 so as to be withdrawn upon actuation thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A safety swimming pool cover assembly comprising a pair of winding elements adapted to be disposed at opposite ends of a swimming pool and having a cover assemblage operatively connected therebetween, drive means for paying the cover assemblage back and forth between said winding elements between operative and inoperative positions with respect to the swimming pool, comprising a pair of pivotally mounted electric motors related to said winding elements respectively, and each swingable in opposite directions respectively, a friction drive between each motor and its related winding element rendered effective and ineffective in response to swinging of the motor in opposite directions, spring means for swinging each motor in one direction, and electromagnetic means for swinging each motor in the opposite direction.

2. The combination of claim 1 including switch means operative by wiping engagement with said cover assembly to control said electromagnetic means.

*3. The combination of claim 1 including a ratchet wheel secured coaxially to one of said winding elements, a solenoid having an armature engaged with said ratchet wheel whereby to prevent rotation of said winding elements until said solenoid is energized, means energizing said solenoid for withdrawing said armature from said ratchet wheel when either of said motors is rendered effective for driving its associated winding element.*

*4. A safety swimming pool cover assembly comprising horizontally disposed winding elements adapted to be disposed at ends of swimming pools and having connected thereto for winding thereon a cover of sufficient length and width to completely cover a pool with which it is to be operatively associated, said winding elements causing positive movement in each direction selectively of said cover from an operative position in which said cover completely covers the swimming pool to an inoperative position in which the cover is wound up within said winding elements for storage and uncovers the swimming pool, horizontally disposed guide means adapted to be positioned along opposite sides of the swimming pool, said cover having marginal side edges secured to said guide means and freely slidably movable therealong when said cover is moved by said winding elements, said guide means having continuous, uninterrupted contact with the entire length of that portion of said marginal side edges which are disposed therebetween and so disposed as to cause said cover to completely cover the width of the swimming pool, drive means including a friction drum means drivingly secured coaxially to said winding elements, electric motor means movably mounted adjacent said friction drum means for movement into and out of operative driving engagement therewith, means for moving said motor means out of said driving engagement and means for moving said motor means into said driving engagement, control means connected to said motor means and actuated by said cover when in said operative and inoperative positions for selectively actuating said moving means.*

*5. A safety swimming pool cover assembly comprising, storage winding means adapted to be disposed at a swimming pool end, a cover having side edges and being connected to said storage winding means to be unwound or wound up therein and enclosed thereby, guide means adapted to be disposed along opposite sides of said pool, means secured along the entire side edges of said cover and cooperating with said guide means to maintain said cover taut between its side edges, drive means connected to said storage winding means, means for deenergizing said drive means for engagement of said cover therewith and means for mechanically disconnecting said drive means from the storage winding means when the drive means is de-energized, said winding means including power means directly connected to a drum and rotatably mounted within a storage housing, said means disposed along the side edges of said cover comprising flexible means fastened to said cover edges for maintaining the cover taut and imparting movement thereto, said drum having pulley means at opposite ends thereof for winding or unwinding said flexible means thereon and a separate intermediate portion for receiving the cover thereon, said mechanical disconnect means including means displaceably mounted within said housing operative to drivingly disconnect the power means from the drum in response to cessation of unwinding of the cover from the drum.*

References Cited in the file of this patent or the original patent

UNITED STATES PATENTS

| | | |
|---|---|---|
| 1,238,360 | Surber | Aug. 28, 1917 |
| 1,585,270 | Stevenson | May 18, 1926 |
| 2,084,733 | Kahliff | June 22, 1937 |
| 2,140,220 | Colvin | Dec. 13, 1938 |
| 2,668,586 | Luckie | Feb. 9, 1954 |
| 2,754,899 | Karobonik et al. | July 17, 1956 |
| 2,755,081 | Johnson et al. | July 17, 1956 |
| 2,844,196 | Jones | July 22, 1958 |